No. 722,028. PATENTED MAR. 3, 1903.
D. LUBIN.
AGRICULTURAL IMPLEMENT.
APPLICATION FILED MAR. 20, 1902.
NO MODEL. 4 SHEETS—SHEET 1.
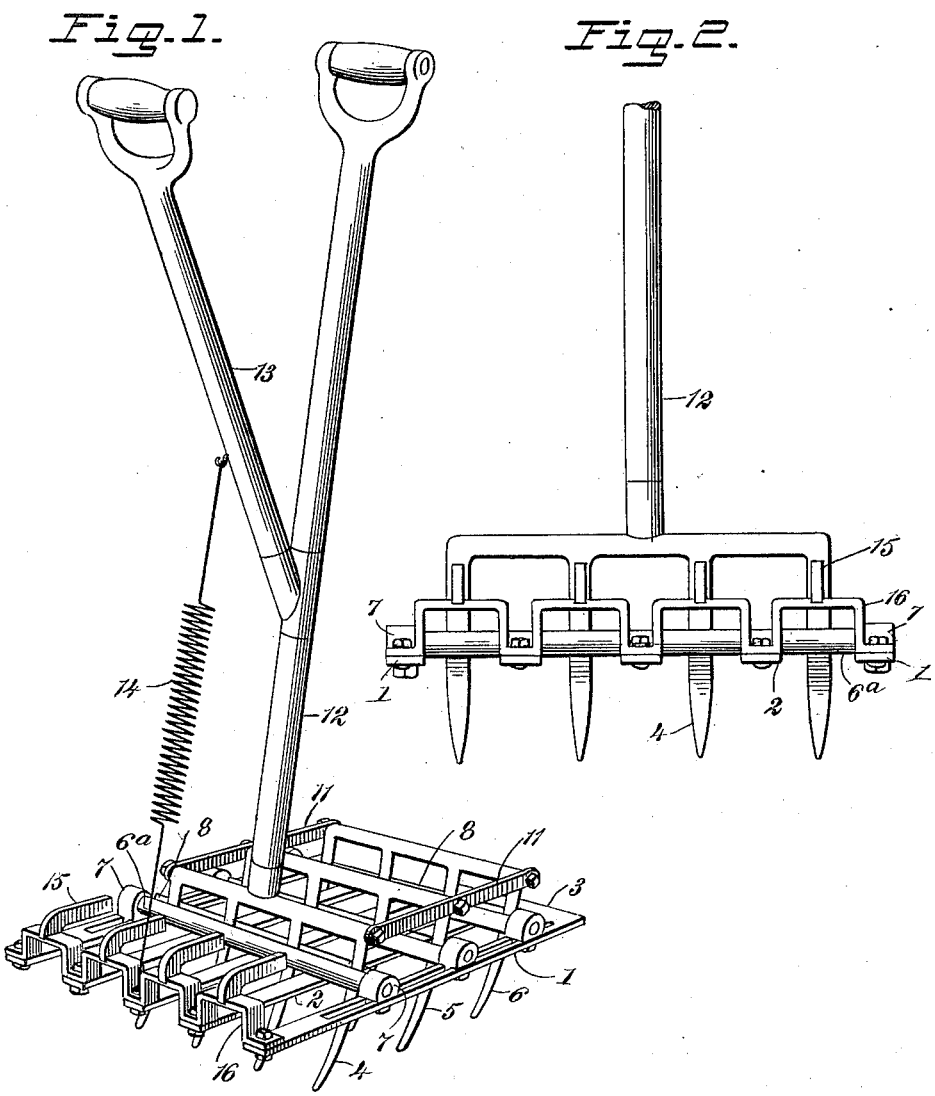
WITNESSES:
James F. Duhamel.
C. R. Ferguson
INVENTOR
David Lubin
BY
ATTORNEYS No. 722,028. PATENTED MAR. 3, 1903.
D. LUBIN.
AGRICULTURAL IMPLEMENT.
APPLICATION FILED MAR. 20, 1902.
NO MODEL. 4 SHEETS—SHEET 2.

WITNESSES:
James F. Duhamel.
C. R. Ferguson

INVENTOR
David Lubin
BY
ATTORNEYS

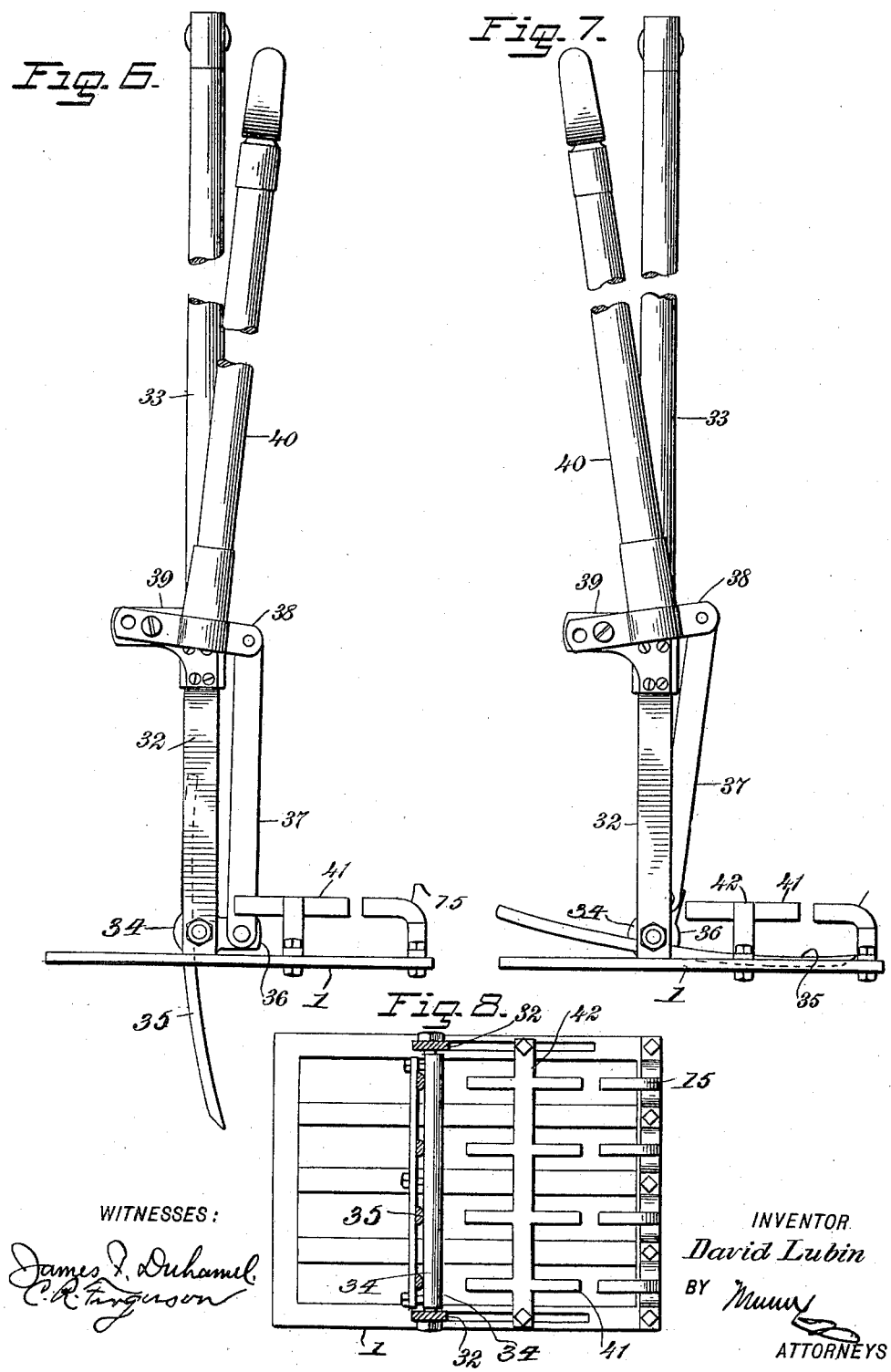

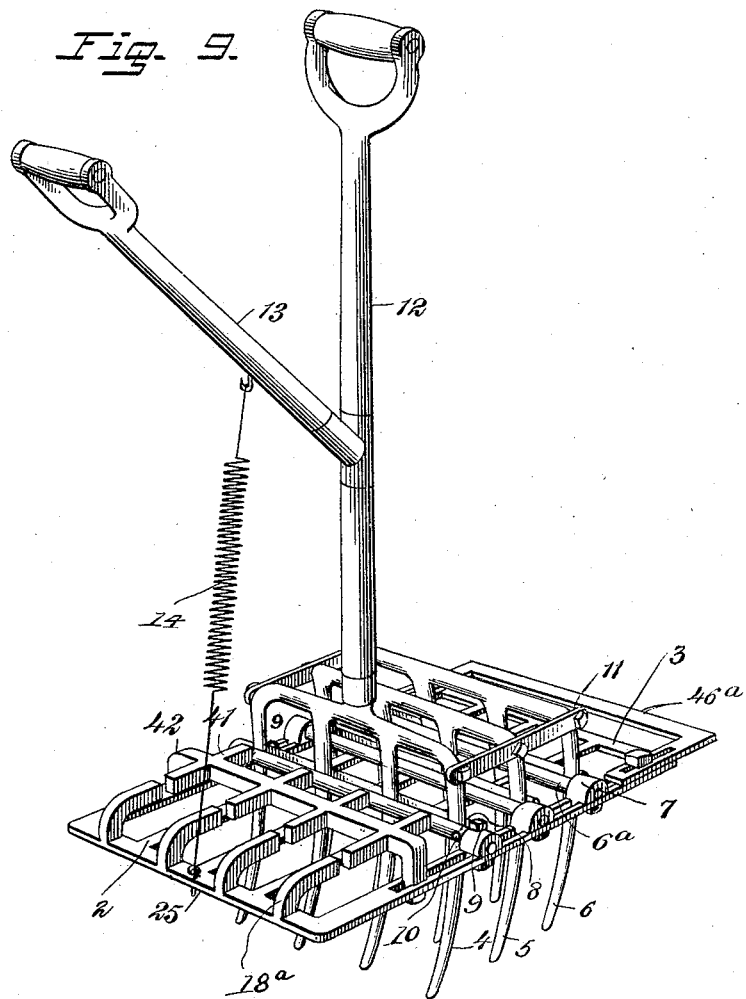

ABBREV# UNITED STATES PATENT OFFICE.

DAVID LUBIN, OF NEW YORK, N. Y.

AGRICULTURAL IMPLEMENT.

SPECIFICATION forming part of Letters Patent No. 722,028, dated March 3, 1903.

Application filed March 20, 1902. Serial No. 99,069. (No model.)

*To all whom it may concern:*

Be it known that I, DAVID LUBIN, a citizen of the United States, and a resident of the city of New York, borough of Manhattan, in the county and State of New York, have invented a new and Improved Agricultural Implement, of which the following is a full, clear, and exact description.

This invention relates to improvements in tools for digging or working ground, the object being to provide an implement of this character that may be operated with comparatively little manual exertion and from the action of which all the molecules of the earth operated upon will be set in motion, so that the particles acting one upon another will cause a fine separation, as the particles practically dissolve or move in all directions, leaving the ground in a light and porous condition, with the particles thoroughly displaced, thus permitting aeration or oxidation, so essential to fine cultivation.

A further object is to so arrange the device that it may be adjustable for different depths of work and to operate close to plants without endangering the same.

I will describe an agricultural implement embodying my invention and then point out the novel features in the appended claims.

Reference is to be had to the accompanying drawings, forming a part of this specification, in which similar characters of reference indicate corresponding parts in all the figures.

Figure 4:
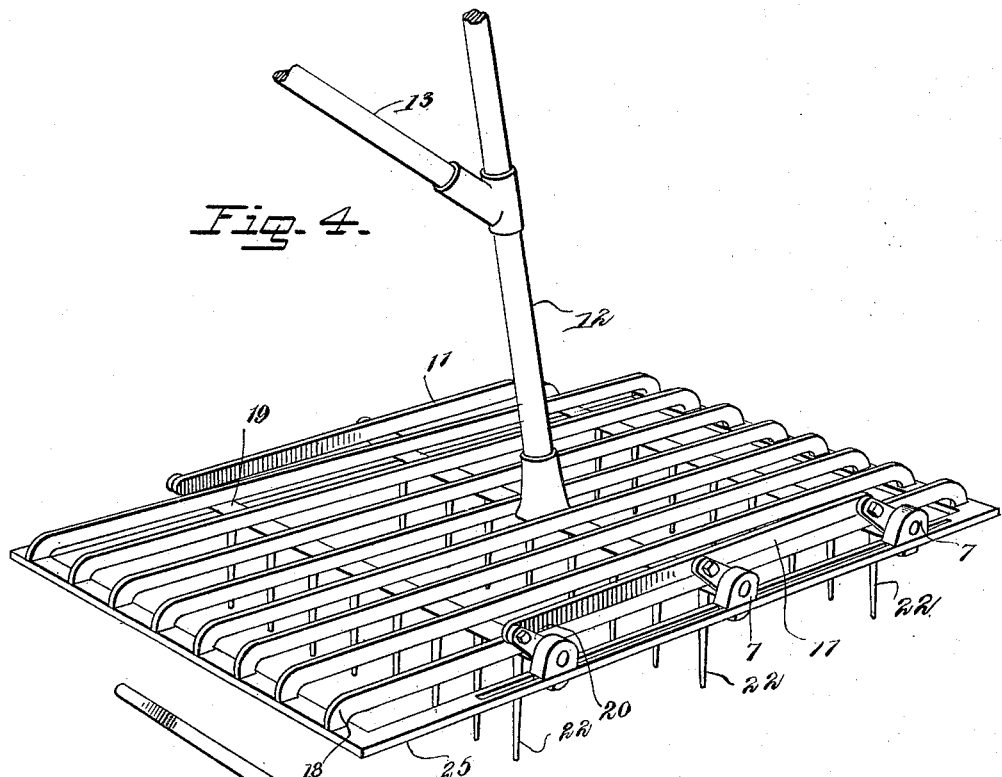
Figure 5:
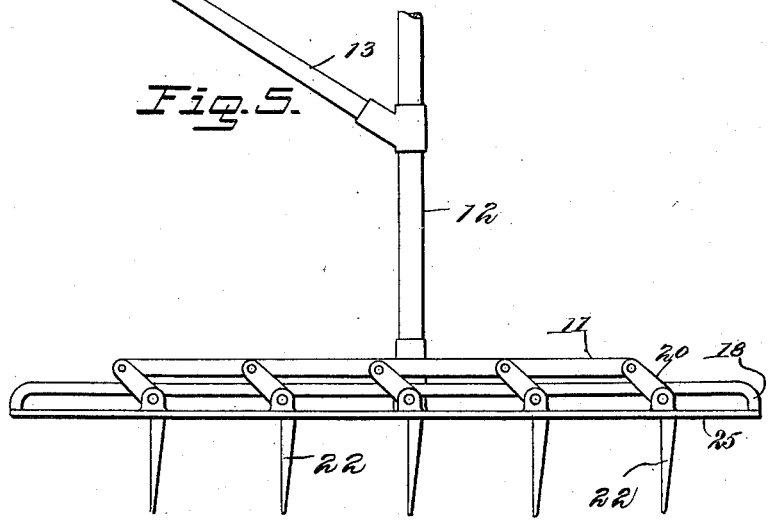

Figure 1 is a perspective view of one form of agricultural implement embodying my invention. Fig. 2 is a front view thereof. Fig. 3 is a sectional detail showing a means for adjusting the digging-tines. Fig. 4 is a perspective view showing another form of the invention. Fig. 5 is a side elevation showing still another modification. Figs. 6 and 7 are side elevations showing another modification with the parts in different positions. Fig. 8 is a plan view thereof, and Fig. 9 is a perspective view showing the several parts assembled.

Referring to the drawings, 1 designates a frame adapted to rest on the surface of the ground when the tool is in operation. This frame is composed of longitudinal breaking-bars 2, connected at the rear by a cross-bar 3. Mounted to swing on the frame 1 is plurality of digging-tines, as indicated at 4, 5, and 6. Each set of tines is adjustably connected to a rock bar or shaft $6^a$. The several rock bars or shafts have bearings in boxes 7, adjustable lengthwise of the frame 1. For this purpose the side members of the frame are longitudinally slotted, and the boxes have tongue portions extended through the slots, and they may be held as adjusted by suitable set-bolts.

To permit of a vertical adjustment of the tines relatively to the rock-bars, the tines are arranged between a rock-bar and a clamping-bar 8, as clearly illustrated in Fig. 3. When the tines are adjusted to proper position for shallow or deep digging, nuts 9 on the clamping-bolts 10 are to be tightened.

The upper cross-bars of the several series of digging-tines are connected at the ends by link-bars 11. By this arrangement when one of the sets of digging-tines is operated the others will be moved therewith.

Extended upward from one of the sets of tines is an operating-handle 12, and to reduce the manual exertion required to operate the device to a minimum I provide an auxiliary handle 13, which is suitably connected to the handle 12, and as a means for moving the handles with the several tines to normal position with relation to the frame a spring 14 is employed. This spring at its upper end is connected to the handle portion 13 and at its lower end to the front end of the frame 1.

In the operation of this device when the tines are forced into the ground the handles are to be rocked rearward, which will swing the ends of the breaking-tines upward, forcing the ground between the bars 2 of the frame. These bars will practically break the dirt forced between them; but in some instances I may employ auxiliary breakers. These auxiliary breakers are indicated at 15 and consist of fingers extended from a front bar 16, attached to the front ends of the breaker-bars 2. These auxiliary breaker-bars 15 alternate with the bars 2, and therefore any dirt that may be elevated in the form of lumps will by engaging with the auxiliary breakers be finely pulverized, and in the actual operation it is found that the molecules of the earth are finely separated and the broken ground is in condition to receive air that may freely pass through it.

In some instances when it is desired to lengthen the frame the auxiliary breakers 15 may be turned to point forward, or in an opposite direction to that indicated in Fig. 1. To do this, it is only necessary to remove the bolts fastening the front bars 16 to the breaker-bars 2. By providing for the adjustment of the breaking-tines longitudinally of the frame and also by providing the vertical adjustment of the digging-tines the device may be regulated to dig into the earth close around plants or vines and to any required depth.

It is quite obvious that in the operation the operator will grasp the handle 12 with one hand and the handle 13 with the other hand. Then as the handles approach their lowermost position the handle 12 may be released, which will obviate a person bending his back to any considerable extent.

In Fig. 4 I have shown a frame 25, having breaker-bars 18 extended throughout its length and connected with the front and rear cross-bars of the frame. Rock-bars 19 are mounted in the frame and are adjustable lengthwise of the frame, and the several bars have at their ends upwardly-extended arms 20, which have pivotal connection with link-bars 11, so that the several sets of tines 22, carried by the rock-bars, will be simultaneously operated. From the central bar, as here shown, a handle 12 extends upward, and this handle is provided with an auxiliary handle 13.

In the example of my improvement shown in Fig. 5 I employ a frame 25, having the breaker-bars 18, and connected with the frame are five sets or series of digging-tines 22, from the rock-shafts of which arms 20 extend upward, the several arms being connected pivotally with the link-bars 11.

In the operation of the two devices just described the tines are rocked by the handles with relation to the frame and the dirt is forced against the breaking-bars, by means of which it is thoroughly pulverized.

If desired, the devices described may be mounted on rollers or wheels, so as to be easily moved over the ground, and this may be quite necessary in heavy machines.

In Figs. 6, 7, and 8 I have shown the device as adapted for operation by link connections with the swinging handle. Referring particularly to these figures, 1 indicates the frame, having auxiliary breaking-bars 15. From the sides of the frame 1 a yoke 32 extends upward, and rigidly attached to this yoke is a handle 33. A rock-bar 34 has its bearings in the sides of the yoke 32, and to this rock-bar 34 digging-tines 35 are adjustably connected—that is, arranged for vertical adjustment. Extended forward from the rock-bar is an arm 36, from which a link 37 extends upward and connects at its upper end with a short link 38, pivoted to an arm 39, extended rearward to the handle 33, and connected to this short link 38, between its forward end and its pivoted point, is a handle 40. In this device the yoke carrying the digging-tines may be moved forward or rearward with relation to the frame and secured by any suitable means, and I may employ in connection with the auxiliary breakers 15 supplemental breakers 41, connected to a cross-bar 42, adjustable lengthwise of the frame 1. In the operation of this example of my invention the digging-tines are to be forced into the ground by a person placing his foot either on the frame or on the upper cross-bar of the yoke 32. When the tines are thus inserted, the handle or lever 40 is to be drawn backward, which will rock the digging-tines upward, forcing the dirt between the breaking-bars of the frame and also against the breaking-bars arranged above the same. The position of the parts when inserted in the ground is indicated in Fig. 6, while the final operation is indicated in Fig. 7. As the frame may in some instances be too short I provide an extension-frame $46^a$, that may be bolted thereto either at the rear end or at a side. By this extension-frame a greater bearing on the ground-surface is provided, which will prevent the forcing of the frame into the ground, particularly soft ground; but in the operation of the device a person may stand on this extension portion of the frame.

In Fig. 9 stub-bars $18^a$ are formed integral with the front portion of the frame and will perform a service similar to the bars 15.

In certain instances I have shown a plurality of sets of digging-tools and in other figures I have shown a single set, and therefore it will be understood that my invention is not limited to any particular number of sets.

Having thus described my invention, I claim as new and desire to secure by Letters Patent—

1. An agricultural implement comprising a frame adapted to rest on the ground-surface, breaking-bars on the frame and tines having swinging movement on the frame, substantially as specified.

2. An agricultural implement comprising a frame, breaking-bars on the frame and tines mounted to swing on the frame and adjustable vertically with relation thereto, substantially as specified.

3. An agricultural implement comprising a frame, and tines mounted to swing on the frame, the said tines being adjustable vertically and lengthwise of the frame, substantially as specified.

4. An agricultural implement comprising a frame adapted to rest on the surface of the ground, digging-tines having swinging connection with the frame, breaking-bars on the frame, and supplemental breaking-bars on the frame, substantially as specified.

5. An agricultural implement comprising a frame having breaking-bars, tines mounted to swing on the frame, and supplemental breaking-bars adjustable on the frame, substantially as specified.

6. An agricultural implement comprising a frame having breaking-bars, digging-tines mounted to swing on said frame, and an extension-frame for the first-named frame, substantially as specified.

7. An agricultural implement comprising a frame, breaking-bars on the frame, a plurality of digging-tines mounted to swing on said frame, and means for causing simultaneous movement of the several sets of digging-tines, substantially as specified.

8. An agricultural implement comprising a frame, a rock-bar, bearings for said rock-bar adjustable lengthwise of the frame, a clamping-bar carried on the rock-bar, and digging-tines clamped between said clamping-bar and the rock-bar, substantially as specified.

9. An agricultural implement comprising a frame, digging-tines mounted to swing on the frame, a handle extended upward from said tines, and an auxiliary handle extended forward from the first-named handle, substantially as specified.

10. An agricultural implement comprising a frame, the outer side portions thereof being longitudinally slotted, bearing-boxes adjustable in said slots, a rock-bar mounted in said boxes, digging-tines carried by the rock-bar, and a handle extended upward from the tines, substantially as specified.

11. An agricultural implement comprising a frame having breaking-bars, a plurality of digging-tines mounted to swing on said frame, a handle extending from one set of digging-tines, and bars having pivotal connection with the tines, substantially as specified.

In testimony whereof I have signed my name to this specification in the presence of two subscribing witnesses.

DAVID LUBIN.

Witnesses:
  JNO. M. RITTER,
  C. R. FERGUSON.